United States Patent [19]

Amoroso, Jr.

[11] 3,766,556
[45] Oct. 16, 1973

[54] CHANNEL SWITCHING PHASE INTERFEROMETER RADAR RECEIVER

[75] Inventor: Salvatore Amoroso, Jr., Fairfield, Conn.

[73] Assignee: United Aircraft Corporation, East Hartford, Conn.

[22] Filed: Mar. 28, 1972

[21] Appl. No.: 238,855

[52] U.S. Cl. .......................... 343/16 R, 343/113 R
[51] Int. Cl. ............................ G01s 3/46, G01s 9/02
[58] Field of Search ............ 343/16 R, 16 M, 113 R

[56] References Cited
UNITED STATES PATENTS
3,089,136  5/1963  Albersheim .................. 343/16 R
3,680,102  7/1972  Poinsard ...................... 343/16 M
3,212,089  10/1965  Longacre et al. .............. 343/16 M
3,396,395  8/1968  Ball et al. ..................... 343/113 R Primary Examiner—Malcolm F. Hubler
Attorney—Melvin Pearson Williams

[57] ABSTRACT

Errors causd by IF amplifier and phase detector imbalance and asymmetry are overcome in a phase interferometer radar receiver by ultimate application of the respective antenna inputs to different IF amplifier/limiter channels. The output of the IF amplifier channels are cross coupled and fed to a phase detector employing a quadrature hybrid. The output of the phase detector is switched in synchronism with the IF amplifier input and the non-linearities resulting from cross coupling are linearized.

4 Claims, 5 Drawing Figures

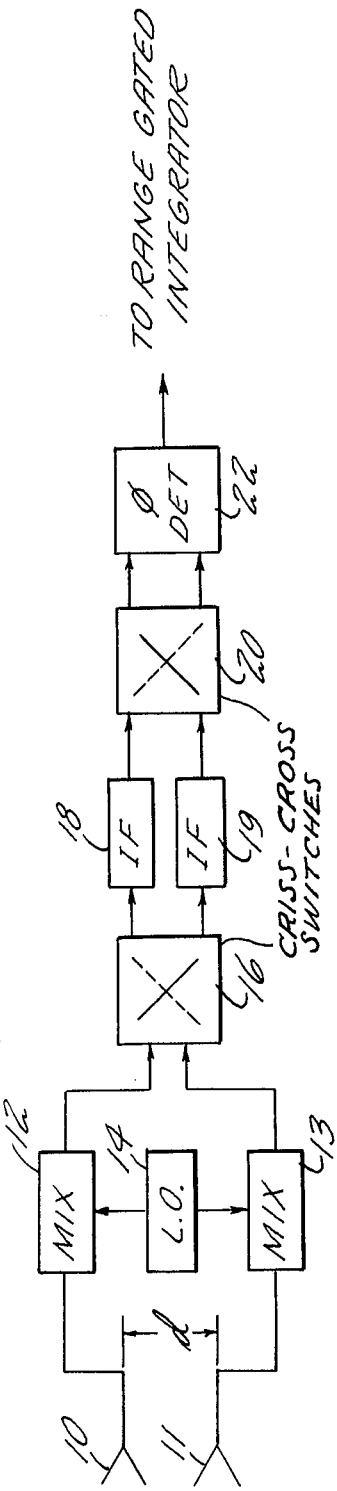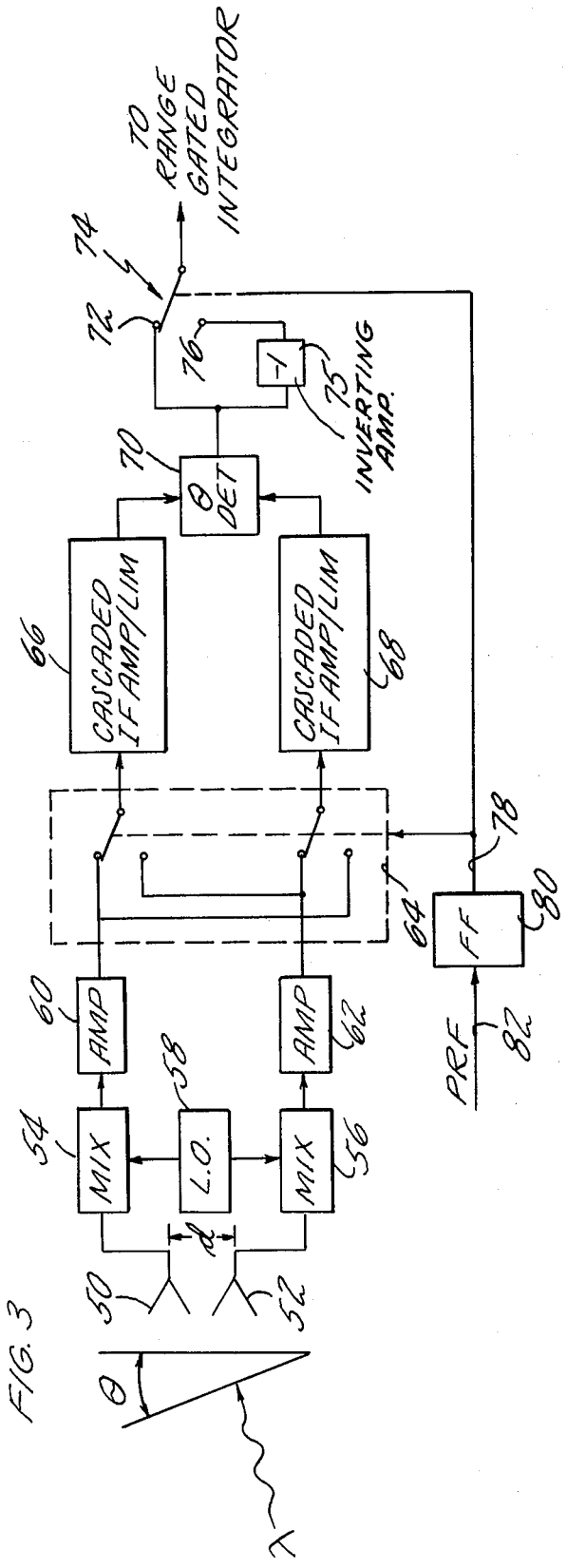

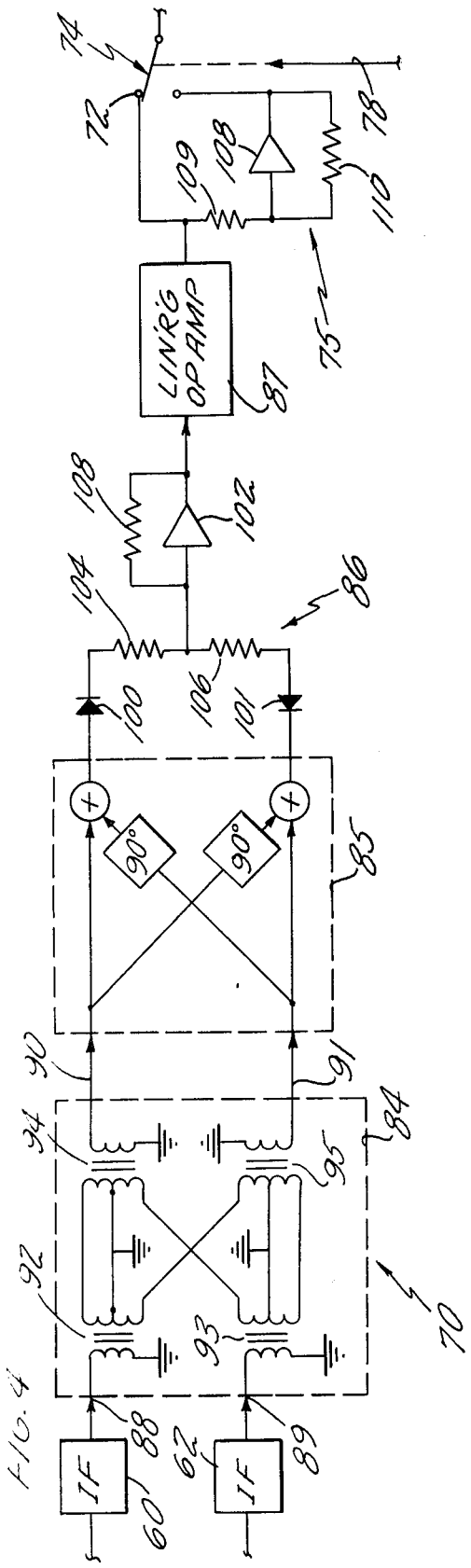
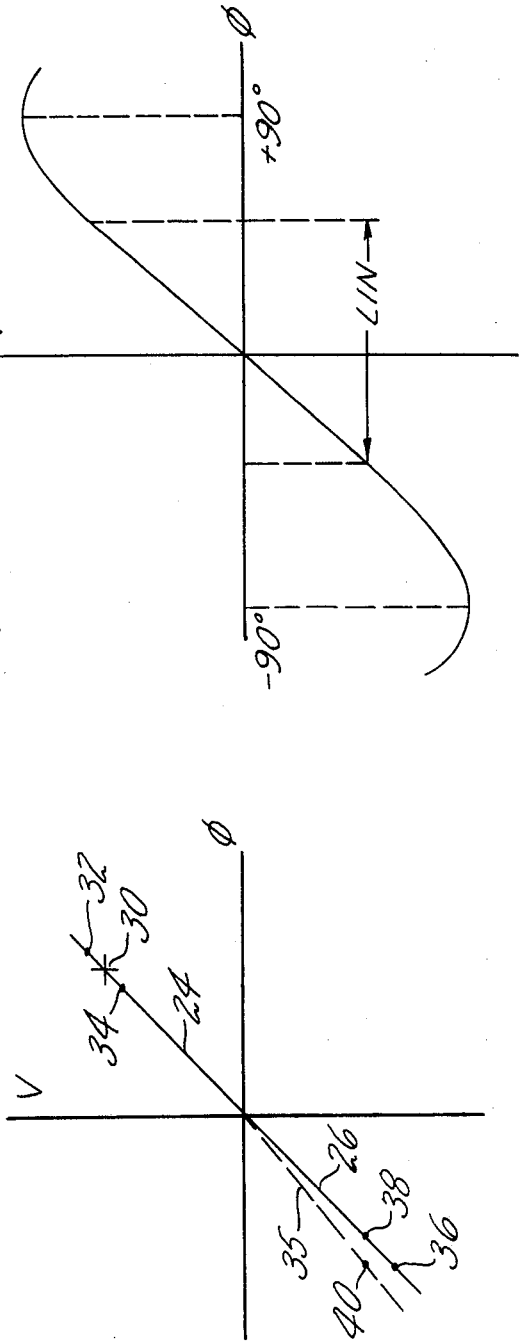

CHANNEL SWITCHING PHASE INTERFEROMETER RADAR RECEIVER

BACKGROUND OF THE INVENTION

1. Field of Invention

This invention relates to phase interferometer radar systems, and more particularly to an improved and simplified receiver therefor.

2. Description of the Prior Art

Phase interferometer radars, sometimes referred to as phase monopulse radars, utilize a pair of receiving antennae, displaced from each other in a plane within which the angle at which a plane wave is incident upon the antennas is to be measured. The difference in the electrical phase of the signals generated within the antenna as a result of the wave is an indication of the angle of incidence. If the wave approaches the antenna from a direction which is parallel with their common boresight axis, the wave will arrive at both antennas simultaneously. However, if the wave approaches at an angle, it reaches one of the antennas before the other, causing a difference in phase in the resulting signal. Measurement of this electrical phase difference provides an indication of the angle of incidence of the wave.

In phase interferometer radars known to the prior art, the signals received at each antenna are first heterodyned to an IF frequency in mixers controlled by the same local oscillator. Then many stages of IF amplification and limiting are applied to normalize the amplitudes of the two signals, thereby to permit phase detection which is free of error due to differences in amplitude. The phase difference is measured at the output of the IF amplifiers, and the signal representative thereof is further processed to determine the wave incidence angle, $\theta$, as a function of the phase angle, $\phi$, in accordance with the following well known relationship:

1. $\theta = \arcsin(\lambda\phi)/(2\pi d)$, where $\lambda$ is the wavelength and $d$ is the antenna spacing.

However, the phase relationship must be preserved in the processing of the signals up to the point where the phase difference between the two signals is resolved. This means that the two channels of signal processing, including mixers, amplifiers, and so forth, must be completely phase balanced. This renders phase interferometer receiving and processing equipment extremely expensive, thus limiting the usage thereof to highly sophisticated systems, such as military navigation, detection, and weapon delivery systems.

The primary problem of balancing two large channels of cascaded IF amplifier/limiting stages has been partially solved in one prior art system by taking advantage of the fact that the more sophisticated phase interferometer radar systems employ pulse to pulse integration of the electrical phase detected at the output of the IF amplifiers. In such a system, the IF amplifier channels are switched on a pulse to pulse basis so that in response to one transmitted pulse a first IF amplifier channel relates to a first of the antennas, and on the next pulse it relates to the other; similarly, the second IF amplifier relates to the second antenna on one pulse and to the first antenna on the next, alternately. However, said systems require very complex and expensive switching at both the input and the output of the amplifiers. Additionally, additional errors resulting from phase detector asymmetry: differences in the positive voltage-versus-phase transfer characteristic of the phase detector in contrast with the negative voltage-versus-phase transfer characteristic of the phase detectors. Further, variations in local oscillator frequency, signal power, temperature, and particularly variations resulting from the aging of equipment over a period of time introduce errors which have not heretofore been compensated adequately in the prior art.

SUMMARY OF INVENTION

The object of the invention is to provide an improved phase interferometer radar receiver having substantially reduced uncompensated errors therein.

According to the present invention, the IF amplifier channels of a phase interferometer radar receiver are switched on a pulse to pulse basis to opposite ones of the receiving antenna; the outputs of the amplifiers are fed through a phase detector and two senses (plus, minus) of its output are alternately selected by a switch synchronized with the IF amplifier input switching for use in range gated integrators of the type known to the prior art.

In accordance further with the invention, the phase detector may comprise a cross coupling network followed by a quadrature hybrid and envelope detection at the output of the quadrature hybrid, together with a linearizing amplifier, the output of which is a voltage bearing a linear relationship to the angle of incidence of the received wave.

The present invention completely eliminates phase tracking errors of the IF amplifiers as well as symmetry errors of the phase detector. The reduced degree of phase and amplitude matching the receiver results in a more producible design, and a design which is far more maintenance-free over the useful life of the system. This permits use of the phase interferometer technique in many new applications which the space, cost, weight or maintainability problems associated with the phase interferometer have precluded in the past.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is a simplified schematic block diagram of an IF channel-reversing phase interferometer radar system known to the prior art;

FIG. 2 is a graphical illustration of phase imbalance and detector asymmetry;

FIG. 3 is a simplified schematic block diagram of an improved phase interferometer radar receiver in accordance with the present invention;

FIG. 4 is a simplified schematic block diagram of a phase detector of the invention; and FIG. 5 is a graphical illustration of the transfer characteristic of a quadrature hybrid detecting circuit.

DESCRIPTION OF THE PREFERRED EMBODIMENT

Referring now to FIG. 1, an improved form of phase interferometer receiver known to the prior art, and referred to breifly with respect to the prior art hereinbefore, comprises a pair of radar receiving antennae 10, 11, each connected to a respective mixer 12, 13 which have a heterodyning frequency applied thereto by a common local oscillator 14. The output of the mixers 12, 13 is fed through a criss-cross switch 16 (a suitably connected double pole double throw RF switch), the outputs of which are fed through respective IF channels 18, 19, which provide signals of normalized, constant amplitude, and thence through a synchronously operated criss-cross switch 20 so as to provide the IF outputs in the proper sense to a phase detector 22. The output of the phase detector 22 is typically fed to a range gated integrator for pulse to pulse integration of the individual signals relating to each of the resolvable units of range in the system. The earliest and most typical sysetm is similar to that described with respect to FIG. 1 except it does not provide for switching the positions of the IF channels 18, 19, and therefore does not include the IF criss-cross switches 16, 20. However, utilization of the switches 16, 20 causes the phase imbalance created between one amplifier and the other in response to one pulse to be opposite to the phase imbalance created on the next pulse, all of which is integrated-out of the final resultant in the range gated integrator section. However, since the IF criss-cross switch 20 comes before phase detection, it must be perfectly phase and amplitude balanced. Additionally, this type of switch is rather expensive. Further, if there is any asymmetry in the phase detector 22, this will cause one-sided errors at its output which are not averaged out by integration.

The asymmetry of a phase detector is illustrated in FIG. 2. Therein, the solid lines 24, 26 represent the positive and negative transfer characteristics, respectively, of a linear and symmetrical phase detector. However, most phase detectors have a certain amount of asymmetry, illustrated by the dashed line 28, which has a lower scale factor or sensitivity than the solid line 26. In such a case, positive phase angles and negative phase angles result in different magnitudes of output voltage. Also illustrated in FIG. 2 is the result of phase imbalance in any point of the receiver upstream of the phase detector. For instance, if there is a phase imbalance between the two receiver channels, then a true phase difference, which might be indicated at the point denoted by a cross 30 might instead show up at the point 32. However, by switching IF channels, this would, in alternative time periods, show up at the point 34; in the integrator, this error would average out and result in a reading at the point 30. When negative phase angles are sensed, similarly, readings would be averaged out between the response at the point 36 and the response at the point 38. But if the phase detector were asymmetrical, then it would be giving different readings for positive angles and negative angles (as illustrated by the line 35).

Thus, although the improved prior art system of FIG. 1 solves the problem of phase imbalance between the IF amplifiers themselves, it does not solve the problem of phase detector asymmetry which can be an especially significant problem in extended range phase detector configurations.

In contrast, as is described more fully with respect to the embodiment of FIG. 3 hereinafter, the present invention will, in the circumstance of phase-imbalance IFs provide, for instance, one signal at the point 32 and perhaps the next signal at a point 40. Thus on alternate pulses, not only is the phase imbalance averaged out, but phase detector nonsymmetry is also averaged out.

Referring now to FIG. 3, a pair of antennas 50, 52 are separated by a distance $d$. A wave, having a wavelength $\lambda$, incident at an angle $\theta$ to the antennas 50, 52 will provide a phase difference in the signal generated within the antennas. The antennas 50, 52 each feed respective mixers 54, 56 which heterodyne the RF signals received thereat in response to a signal from a local oscillator 58. The IF signal from the mixers 54, 56 are applied to respective amplifiers 60, 62 which perferably comprise low-noise IF amplifier stages which are matched in gain and in phase/amplitude characteristics. The output of the amplifiers are connected to a double pole double throw switch 64 which is arranged to provide a criss-cross function so that, with the switch in the position shown, the amplifier 60 is connected to a channel 66 of cascaded IF amplifier/limiter stages, and the amplifier 62 is connected to a channel 68 of cascaded IF amplifier/limiter stages to provide signals of normalized, constant amplitude. On the other hand, with the position of the switch reversed, the amplifier 62 is connected to the channel 66 and the amplifier 60 is connected to the channel 68. The IF switch 64 may comprise a simple series/shunt configuration of PIN diodes (diodes which at high frequencies, have a variable resistance as a function of a DC current through them) since the switching speed is not critical; the switch may be transferred from one position to another during the receiver dead time (that is, just before each transmitted pulse), when no signals could be received in any case. Other suitable forms of RF switches known to the prior art may be employed if desired. The switch 64 in FIG. 3 is thus similar to and performs the same function as the switch 16 in the prior art system of FIG. 1.

Each of the amplifiers 60, 62 is connected to respectively opposite poles of the two throws of the switch 64, as illustrated in simplified schematic form in FIG. 3. The output of the switch 64 is applied to the cascaded IF amplifier limiter stages 66, 68 so as to provide normalized outputs to a phase detector 70. The phase detector 70 may be any type known to the art, and as such is the same as the phase detector 22 in the prior art system of FIG. 1. On the other hand, it may comprise a phase detector of the form described with respect to FIG. 4 hereinafter. The output of the phase detector 70 is applied to one pole 72 of a video switch 74 with a gain of +1 and is applied to a second pole 76 of the switch 74 with a gain of −1, provided by an inverting amplifier 75. The switch 74 is operated in synchronism with the switch 64 in response to successive transmitter pulses. This may, for instance, be achieved by controlling the switches 64, 74 by one output 78 of a flip flop 80 which is triggered so as to reverse its states once for each transmitted pulse in response to a signal on a line 82 derived from the transmitter pulse at the pulse repetition frequency. Other switch controls may be used, and switching may be effected on other than an every pulse basis if desired. Thus in the circuit of FIG. 3, the sense of operation of the IF amplifiers 66, 68, as well as the phase detector 70, is reversed in each transmitted pulse so as to accommodate not only differences in the IF channels, but lack of symmetry in the phase detector (as explained with respect to FIG. 2 hereinbefore). The output of the switch 74 is applied to the range gated integrator, as in the case of the prior art. The differences of sense (+, −) of alternative outputs of the switch 74 are averaged out in the integrator.

A specific embodiment of a phase detector 70, which is particularly well suited for utilization in a phase interferometer receiver in accordance with the present invention, is illustrated in FIG. 4 wherein those components which are the same as illustrated in FIG. 3 are provided with the same reference numerals as in FIG. 3. In FIG. 4, the phase detector 70 comprises an IF cross coupling network 84, an IF quadrature hybrid 85, envelope detecting and summing means 86, and a linearizing operational amplifier 87.

The cross coupling network 84 operates to add the two vector waveforms from the IF amplifiers 60, 62 at its inputs 88, 89 in a vector summation so as to provide two new vectors at its outputs 90, 91 which have a relative phase angle less than that of the relative phase angle of the input waveforms. Each input 88, 89 is connected to the primary of a related broadband IF transformer 92, 93 the secondaries of which split the power which is cross coupled to similar transformers 94, 95 which, however, have split primaries and single secondaries so as to combine the portion of the waveform in each channel with a portion of the waveform of the other channel. The vector summation technique is described in more detail in my commonly owned copending application, Ser. No. 236,046 filed on Mar. 20, 1972; in that case, RF cross coupling is utilized for a similar purpose (relative phase angle compression) using, however, RF power-splitters and combiners instead of broadband IF power splitters and combiners (90–95) as is the case herein.

The outputs 90, 91 of the IF cross coupling network 84 are applied to the input of the IF quadrature hybrid circuit 85. This is a circuit which is well known in the art and couples a portion of the power at each input, with a 90° phase shift, to each of the outputs, and provides an output signal, the amplitude or envelope of which is a function of the relative phase angle of the two vector waveforms at its input. The transfer characteristic of the IF quadrature hybrid 85 is illustrated in FIG. 5 as a nearly symmetrical characteristic which is monotonic between −90° and +90° of input phase angle and which has a linear portion which may, for instance, be between −45° and +45° of input phase angle, although this varies to some extent in dependence upon the detailed implementation of the quadrature hybrid 85. The reason for relative phase angle compression in the cross coupling network 84 is to compress the relative phase angle so as to be within the linear region of the transfer characteristic of the quadrature hybrid 85. Thus, reducing the angle by about half would render the transfer characteristic of the quadrature hybrid 85 linear for relative phase angles at the inputs 88, 89 of the cross coupling network 84 of ±90°; additional phase compression (by suitable adjustment of the parameters of the cross coupling network 84) can provide still further phase compression so as to permit resolving angles of incidence ($\theta$) of still greater angles without ambiguity. The IF quadrature hybrid 85 is well known in the art and readily available in the market.

The envelope of each output of the quadrature hybrid 85 is detected by oppositely poled diodes 100, 101, and the envelopes are summed by a summing amplifier 102 which is provided with equal input summing resistors 104, 106 and a feedback resistor 108, as is known in the art. By detecting the positive envelope in the diode 100 and the negative envelope in the diode 101 and summing these, the difference of the two envelopes are taken; similarly, if both diodes are poled in the same direction and a differential amplifier is used, the result would be the same. As is known, the difference in the amplitude (the magnitude of the envelope) of the IF output of an IF quadrature hybrid is a function of the phase angle difference of the IF input signals applied thereto. Thus, the amplifier 102 provides at its output a DC signal having a magnitude which is proportional to the relative phase angle of the two waves applied to the input of the IF quadrature hybrid 85. The output of the amplifier 102 is applied to a linearizing operational amplifier 87 to linearize the voltage versus phase angle characteristic of the apparatus 84–86, in a manner described in the aforementioned copending patent application. The linearizing operational amplifier 87 may comprise a high gain amplifier with a plurality of breakpoint feedback paths so as to vary the gain of the amplifier in a manner which is inverse to the nonlinear characteristic of the apparatus 84–86. All of this is in accordance with techniques which are well known in the art. As an example, the inverting amplifier 75 may comprise a high gain amplifier stage 108 having equal input and feedback resistors 109, 110, thereby to simply invert the signal applied thereto.

Thus, the invention comprises elimination of errors in a phase interferometer radar receiver which result from imbalance in the two IF channels as well as asymmetry of the phase detecting network, by means of choice of positive and negative detected phase differences selected in synchronism with an IF channel input criss-cross switch. And, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of my invention, that which I claim as new and desire to secure by Letters Patent of the United States is:

1. In a phase interferometer radar receiver of the type having a pair of mixers adapted to produce related IF signals in response to signals received at a pair of antennas thereof, a pair of IF channels for amplifying the IF signals so as to provide normalized constant amplitude signals and a phase detector responsive to the IF amplifiers to provide a voltage indicative of the relative phase angle of the two IF signals to pulse-to-pulse integration means, the improvement comprising:

an IF switch arranged to connect a first one of said mixers to a first one of said IF channels and a second one of said mixers to a second one of said IF channels when in a first position, and to connect said first mixer to said second IF channel and said second mixer to said first IF channel when in a second position;

inverting means for producing a signal comprising the negative of the output of said phase detector;

means including a video switch connected to said inverting means and to said phase detector, said video switch selecting said phase detector output when in a first position and selecting the negative of said phase detector output when in a second position; and control means for operating said two switches in syncrhonism.

2. The improvement according to claim 1 wherein said switch control means is operated in response to signals derived from the main transmitter pulse, thereby to reverse the position of said switch positions once for each transmitted pulse.

3. In a phase interferometer of the type having a pair of mixers providing respective IF signals in response to RF signals received at a related pair of antennas to a related pair of channels of IF amplifiers for providing IF signals of a normalized, constant amplitude to a phase detector which in turn provides a signal indicative of the relative phase of the two IF signals provided by said mixers to pulse-to-pulse integration means, and the improvement comprising:

an IF amplifier channel input switch having two positions, said switch when in a first one of said positions connecting a first one of said mixer stages with a first one of said IF amplifier channels and connecting a second one of said mixer stages to the second one of said IF amplifier channels, and, when in its second position, connecting said first mixer to said second IF amplifier channel and connecting said second mixer to said first IF amplifier channel;

cross coupling means having a pair of inputs and a pair of outputs, said pair of inputs connected to respective ones of the outputs of said IF amplifier channels said means providing a portion of the energy at each of its inputs to each of its outputs in a manner to compress the relative phase angle between the outputs of said IF amplifier channels;

IF quadrature hybrid means having a pair of inputs connected to the respective ones of the outputs of said cross coupling means and having a pair of outputs and providing at said outputs IF signals, the difference in the magnitude of the envelopes of which is an indication of the relative phase angle of the signals applied at the inputs thereto;

detecting means for detecting and summing the relative amplitudes of the outputs of said IF quadrature hybrid means;

a linearizing operational amplifier connected to the output of said detecting means;

means for providing a signal which is the negative of the output of said linearizing operational amplifier;

a video switch connected to the output of said inverting means and to the output of said linearizing amplifier and providing at its output, when in one position, the output of said linearizing operational amplifier and, when in the other position, the negative of the output of said linearizing operational amplifier; and control means for operating said two switches in synchronism.

4. The improvement according to claim 3 wherein said switch control means is operated in response to signals derived from the main transmitter pulse, thereby to reverse the position of said switch positions once for each transmitted pulse.

* * * * *

UNITED STATES PATENT OFFICE
CERTIFICATE OF CORRECTION

Patent No. 3,766,556      Dated October 16, 1973

Inventor(s) Salvatore Amoroso, Jr.

It is certified that error appears in the above-identified patent and that said Letters Patent are hereby corrected as shown below:

Column 2, line 32, "matching the receiver" should read -- matching in the receiver --.

Signed and sealed this 17th day of September 1974.

(SEAL)
Attest:

McCOY M. GIBSON JR.
Attesting Officer

C. MARSHALL DANN
Commissioner of Patents